United States Patent
Fang et al.

(10) Patent No.: US 9,380,291 B2
(45) Date of Patent: Jun. 28, 2016

(54) INFORMATION DISPLAY METHOD AND SYSTEM, SENDING MODULE AND RECEIVING MODULE

(75) Inventors: Wen Fang, Shenzhen (CN); Jiejie Liu, Shenzhen (CN)

(73) Assignee: ZTE CORPORATION (CN)

( * ) Notice: Subject to any disclaimer, the term of this patent is extended or adjusted under 35 U.S.C. 154(b) by 187 days.

(21) Appl. No.: 14/351,652

(22) PCT Filed: Jan. 17, 2012

(86) PCT No.: PCT/CN2012/070463
§ 371 (c)(1),
(2), (4) Date: Apr. 14, 2014

(87) PCT Pub. No.: WO2012/152083
PCT Pub. Date: Nov. 15, 2012

(65) Prior Publication Data
US 2014/0313285 A1 Oct. 23, 2014

(30) Foreign Application Priority Data
Oct. 13, 2011 (CN) .......................... 2011 1 0310180

(51) Int. Cl.
*H04N 13/00* (2006.01)
*H04N 13/04* (2006.01)
*H04W 4/12* (2009.01)

(52) U.S. Cl.
CPC ....... *H04N 13/0059* (2013.01); *H04N 13/0048* (2013.01); *H04N 13/0062* (2013.01); *H04N 13/0066* (2013.01); *H04N 13/0402* (2013.01); *H04W 4/12* (2013.01)

(58) Field of Classification Search
CPC H04W 4/12; H04N 13/0066; H04N 13/0048; H04N 13/0059; H04N 13/0062; H04N 13/0402

USPC .......................................................... 348/42
See application file for complete search history.

(56) References Cited

U.S. PATENT DOCUMENTS

| 2003/0163480 A1* | 8/2003 | Takahashi et al. ................ G06F 17/30817 |
| 2005/0131930 A1* | 6/2005 | Jang ................ H04N 21/23412 |

(Continued)

FOREIGN PATENT DOCUMENTS

| CN | 1964527 | 5/2007 |
| CN | 101048996 | 10/2007 |

(Continued)

OTHER PUBLICATIONS

International Search Report for International Patent Application No. PCT/CN2012/070463, mailed Jul. 19, 2012.

(Continued)

*Primary Examiner* — Christopher S Kelley
*Assistant Examiner* — Zhihan Zhou
(74) *Attorney, Agent, or Firm* — McAndrews, Held & Malloy, Ltd.

(57) ABSTRACT

The disclosure relates an information display method which comprises when editing information, a sending end marks, with a 3D display label, a content required by a user or a content designated by a system, encodes the information and sends the encoded information; a receiving end receives the information, parses the information to obtain the content with the 3D display label, pre-processes the obtained content to obtain a 3D view, and display the 3D view in 3D mode. Through the technical solution of the disclosure, the 3D display content is marked and the 3D display processing manner is performed, so that some contents in the information can be effectively displayed with a 3D effect with respect to other contents, thereby achieving the enhancement effect, raising concern of the user, and effectively improving the user experience when the user views the information.

4 Claims, 3 Drawing Sheets

(56) References Cited

U.S. PATENT DOCUMENTS

| | | | |
|---|---|---|---|
| 2006/0019636 A1* | 1/2006 | Guglielmi | H04L 12/5835 455/412.1 |
| 2007/0060193 A1* | 3/2007 | Kim | H04M 1/72555 455/550.1 |
| 2009/0096864 A1* | 4/2009 | Hwang | G06T 17/00 348/42 |
| 2011/0218825 A1* | 9/2011 | Hertenstein | G06Q 40/08 705/4 |
| 2013/0010062 A1* | 1/2013 | Redmann | H04N 5/278 348/43 |

FOREIGN PATENT DOCUMENTS

| | | |
|---|---|---|
| CN | 101562791 | 10/2009 |
| CN | 101651747 | 2/2010 |
| JP | 2005079704 A | 3/2005 |
| JP | 2005159977 | 6/2005 |
| JP | 2007082230 | 3/2007 |
| WO | 2004073309 | 8/2004 |

OTHER PUBLICATIONS

Notice of Reasons for Refusal, 2014-534920, 3 pages.

* cited by examiner

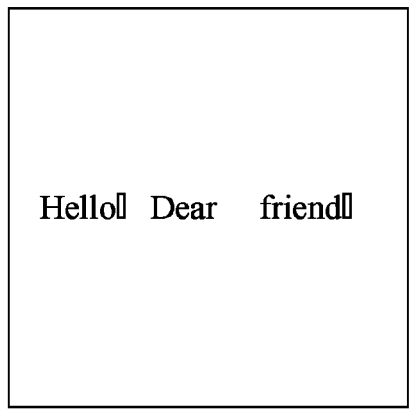 
Fig. 1(a)  Fig. 1(b)
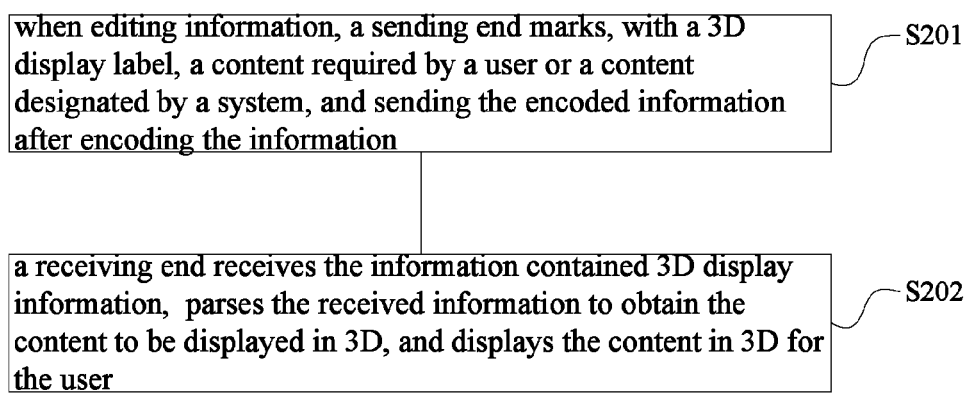
Fig. 2

INFORMATION DISPLAY METHOD AND SYSTEM, SENDING MODULE AND RECEIVING MODULE

TECHNICAL FIELD

The disclosure relates to the communication field, and in particular to an information display method and system, a sending module and a receiving module.

BACKGROUND

Naked-eye 3D display is a display technology emergent on the market currently, and after many years of researches, since 2010, naked-eye 3D products enter the market in different fields rapidly, including TVs, games, laptops, video players, mobile phones and so on 3D is also referred to as stereoscopic, and the basic principles thereof are as follows: since the locations of the left eye and right eye of a person are different, the images viewed thereby are different (when observing an object nearby with the left eye closed individually and the right eye closed individually respectively, the person will feel different). After the different images viewed by the two eyes are transmitted to the brain and processed thereby, the person feels a near-far difference of the object, and then there is a visual stereoscopic feeling. Currently, the basic principles of the existing 3D technologies, whether lens or naked eye, lie in the following, that is, the two eyes of a person see two different left and right images, so that the person feels stereoscopic.

Currently, the existing naked-eye 3D technologies are essentially divided into three classes, which are respectively the barrier of dual-eye visual difference, lens and point light source. Although the particular implementations of these three are different respectively, the basic principles of the implementations thereof are as mentioned above.

Currently, there are mobile phones which support naked-eye 3D display, however, as a communication tool, the mobile phone is not upgraded correspondingly in some application communication protocols relevant to videos and pictures currently, that is, in a corresponding application, no corresponding transmission protocol manner regarding 3D pictures is formed yet.

On the other hand, EMS (enhanced short message) appeared on the market before, and as compared to SMS (short message service), the advantages of EMS to also include sending information such as simple images, voices and animations and so on in addition to sending text short messages like SMS. EMS is a transitional technology, transition from SMS text information to MMS (Multimedia Messaging Service). With the gradual popularization of multimedia messages, EMS gradually exits the market.

The principles of EMS are as follows: transmitting the ID of a video or audio in a short message, while the video and audio corresponding to the ID have been stored in a mobile phone of a receiver, and when the short message corresponding to the ID is played, it will be played by directly invoking the local corresponding multimedia resource to realize the multimedia of the short message. Therefore, this technology can only be used in the situation where the ID protocols of the corresponding multimedia resources are consistent, which also limits the development space thereof.

The realization of EMS mainly relies on two parts in the SMS signaling:

TD-UDH (User Data Header), that is, the user data header in a short message, wherein the data header is located before the text information in the short message signaling.

TD-UDHI (TP-User Data Header Indicator): When the TD-UDHI in a PDU of a short message is 1, it indicates that data header information is included before the text information of the short message.

Serial short message mechanism: since EMS is usually very large, sometimes, even binary image information is transmitted in the data header directly, the capacity of a short message (140 bytes) usually cannot contain the entire EMS, and it needs to be performed by means of serial short message.

Although the EMS service has been gradually replaced by the multimedia message service and out of season, with the gradual advent of naked-eye 3D era, another 3D display method appears in addition to various multimedia effect displays, and some principles of EMS seem to be useful again in the situation how to assign different display effects from other text to perform 3D display on the text concerned by a user in information such as a short message, a multimedia message and Fetion and so on.

SUMMARY

The disclosure provides an information display method and system, a sending module and a receiving module, so as to solve the problem that the naked-eye 3D display is realized on a user terminal.

In order to solve the above-mentioned problem, the disclosure provides an information display method, comprising:

when editing information, a sending end marking, with a 3D display label, a content required by a user or a content designated by a system, and after encoding the label, sending the encoded label;

a receiving end receiving the information, performing parsing to obtain the content, which is marked with the 3D display label, in the information, performing pre-processing to obtain a 3D view, and performing 3D display.

Preferably, the sending end encoding the label is, when the information is a short message, marking at least one location of the content which needs to be displayed in 3D by adding a User Data Header (TD-UDH) cell to a Protocol Data Unit (PDU).

Preferably, the method further comprises:

in the PDU, when a user data header identification (TD-UDHI) is determining that there is the TP-UDH cell before the short message data.

Preferably, the sending end encoding the label is, when the information is a multimedia message, describing the content which needs to be displayed in 3D in the Synchronized Multimedia Integration Language (SMIL) of the multimedia message information content (Content-Type) in the signaling.

Preferably, the content with the 3D display label is text information.

The disclosure also provides an information transmission system, comprising a sending module, and a receiving module, wherein, the sending module comprises:

an editing unit configured to, when editing information, mark, with a 3D display label, a content required by a user or a content designated by a system; and an encoding unit configured to, after encoding the information which is edited by the editing unit, send the encoded information; and the receiving module comprises:

a receiving unit configured to, after receiving the information which contains the content with the 3D display label, parse the information, to obtain the content which needs to be displayed in 3D in the information, and transmit the content which needs to be displayed in 3D to an image processing unit;

the image processing unit configured to pre-process the obtained content which needs to be displayed in 3D to obtain a 3D view, and to transmit the 3D view to a 3D display unit; and the 3D display unit configured to display the obtained 3D view in 3D mode.

In the above-mentioned system, the encoding unit is particularly configured to mark at least one location of the content which needs 3D display by adding, a TD-UDH cell to a PDU when the information is a short message.

In the above-mentioned system, the encoding unit is particularly configured to describe the content which needs to be displayed in 3D in the SMIL of the multimedia information content (Content-Type) in the signaling when the information is a multimedia message.

The disclosure also provides a sending module, comprising, an editing unit configured to, when editing information, mark, with a 3D display label, a content required by a user or a content designated by a system;

an encoding unit configured to, after encoding the information which is edited by the editing unit, send the encoded information; and The disclosure also provides a receiving module, comprising, a receiving unit configured to receive information which contains a content with a 3D display label to parse on the information to obtain the content which needs to be displayed in 3D in the information, and to transmit, the obtained content to an image processing unit;

the image processing unit configured to pre-process the obtained content which needs to be displayed in 3D to obtain a 3D view, and to transmit the 3D view to a 3D display unit; and the 3D display unit configured to display the obtained 3D view in 3D mode.

Through the technical solution of the disclosure, the 3D display content is marked and the 3D display processing manner is performed, so that some contents in the information can be effectively displayed with a 3D effect with respect to other contents, thereby achieving the enhancement effect, raising concern of the user, and effectively improving the user experience when the user views the information.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein:

FIG. 1(a) and FIG. 1(b) are schematic diagrams of a principle that display part of text with a 3D effect;

FIG. 2 is a flow chart of a first embodiment of the disclosure

DETAILED DESCRIPTION OF THE EMBODIMENTS

Figure 3:
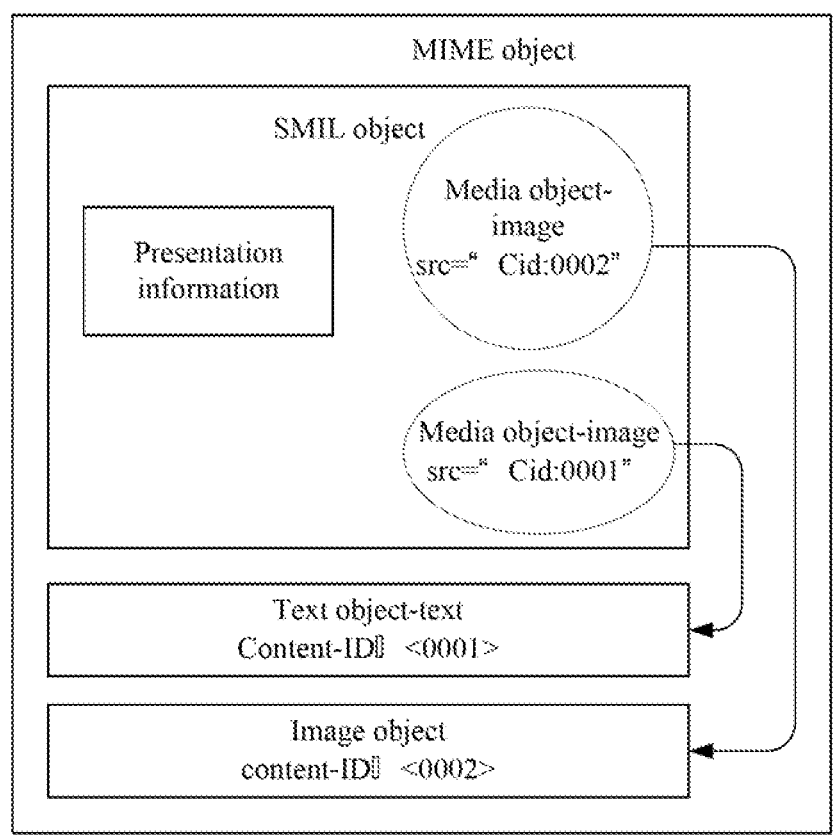
FIG. 3 is an encapsulation protocol diagram of a multimedia message.

In order to make the technical problems to be solved b the disclosure, the technical solution and beneficial effects thereof more clear, the disclosure will be described further in detail in conjunction with the drawings and embodiments. It should be understood that the particular embodiments described here are merely for explaining the disclosure, not for limiting the disclosure.

As shown in FIG. 1, it is a schematic diagram of a principle that display part of text with a 3D effect, in FIG. 1(a), the word "friend" is at right slightly than normal, and in FIG. 1(b), the word "friend" is at left slightly than normal.

According to the principles of human eye imaging, when a person views a near object, he/she will feel than this object is at right slightly when viewing same using the left eye individually, and will feel that the object is at left slightly when viewing same using the right eye individually. Moreover, the closer the distance of the Object, the more apparent this phenomena, and vice versa, the farther the distance of the object, the smaller the difference viewed by the right eye and left eye respectively. The human eye judges the near and far of an object according to the difference between the visual differences of the two eyes between a near scene and a far scene, to produce a 3D vision.

According to this principle, if FIG. 1(a) is received by the left eye of the person, and FIG. 1(b) is received by the right eye of the person, then after being processed by the brain, the human eye will feel that the word "friend" is protrusive and stereoscopic.

Vice versa, if FIG. 1(a) is received by the right eye of the person, and FIG. 1(b) is received by the left eye of the person, then the person will feel that the word "friend" is recessive and stereoscopic.

All these two situations will make word "friend" viewed by the person to produce 3D effects.

However, the principles of naked-eye 3D are to respectively send two pictures with a visual difference to the two eyes of a person, and therefore, with the existing naked-eye 3D technology, when some words in information need to be displayed in 3D, it is only required to respectively move the words, which need to be displayed in 3D, to the right and left to obtain two pictures and display the two pictures to the human eye by means of a naked-eye 3D display unit.

As shown in FIG. 2, it is a flowchart of a first embodiment of the disclosure, and an information display method is provided, which comprises:

step S201, when editing information, a sending end marks, with a 3D display label, a content which needs to be paid attention to according to user requirements or a content designated by a system, wherein the content is in the information, and after encoding the information, the encoded information is sent;

In a short message, at least one location of the content which needs to be displayed in 3D is marked by adding a TD-UDH cell to a PDU; and in a multimedia message, the text which needs to be displayed in 3D can be described in the SMIL (Synchronized Multimedia Integration Language) for Content-Type (multimedia message information content) in the signaling. In addition to the content designated by the user as required, the 3D display content also includes a content designated by the system, wherein the content designated by the system refers to a content which is set to be 3D-displayed by the system as required by default. The content which needs to be displayed in 3D can be text information, and can also be other information, and description will be given by taking text information as an example hereafter.

In the data structure of the first byte "PDU Type" in the PDU for sending the short message, the second bit is TP-UDHI, and when this bit is 1, then it indicates that a TP-UDH exists before the short message data. The most common short message has no data header, and the TP-UDHI is 0. In the disclosure, the location information of the character which needs to be displayed in 3D can be born using the TP-UDH.

Such as the short message content "Hello, dear friend!" in FIG. 1, in the case of Chinese encoding, each Chinese character occupies two bytes, and if it needs to perform naked-eye 3D display on "friend", the location thereof is corresponding to the content displayed by bytes 13 to 16. Then, as long as the protocols of the two parties are consistent, it only needs to use 13, 14, 15, 16 as the indication content of the TP-UDH, and after receiving same, the receiver may display the corresponding words in naked-eye 3D according to this indication.

Of course, in order to distinguish the naked-eye 3D effects and the EMS in the short message, it also needs to add other flags in the data header, to indicate that what is indicated by the following data is the location of the word which needs to be displayed in naked-eye 3D.

There can be various expressions about the formats between the flags mentioned above and the naked-eye 3D display location in the TP-UDH, which will not be listed here one by one, however, those skilled in the art shall know that various expressions in the TP-UDH based on the concept of the disclosure shall fall into the scope of protection of the disclosure.

Hereinafter, an embodiment where an important part of the text in a multimedia message is displayed in naked-eye 3D will be described:

as shown in FIG. 3, it is an encapsulation diagram of a multimedia message, all independent text, images, voices, video contents of MIME (Multipurpose Internet Mail Extensions) and SMIL files are bundled together to encapsulate.

In the multimedia message, the display locations, time control, display mode and so on of various media files in the multimedia message are controlled by an SMIL file. The file is divided into two parts of head and body, in which, area attributes are described in the head, and area identifications and real multimedia message resources are linked together and the attributes of the multimedia message resources are restricted by the body, and an instance is as follows:

```
<smil xmlns="http://www.w3.org/2001/SMIL20/Language>
<head>
<meta name="author" content="ZTE Corporation"/>
<layout>
<root-layout height="176" width="220"/>
<region id="text"    height="160"    width="30" left="0" top=
"170" fit="hidden"/>
<region id="image"   height="160"    width="170" left="0"
top= "0" fit="hidden" />
</layout>
</head>
<body>
<par dur="8000ms">
<text src="cid:text2" alt="Text2.txt" region="text"/>
<img src="image1.gif" alt="cap.gif" region="image"/>
<audio src="audio3.amr" begin="5000ms" end="10000ms"/>
</par>
</body>
</smil>
```

If some words in the multimedia message need to be displayed in 3D, then it needs to mark the locations of the words which needs to be displayed in 3D in the body. Then, as long as the two parties made an agreement in advance, only one attribute needs to be added to text src in the body and description is made in this attribute. For example

```
<body>
<par dur="8000ms">
<text src="cid:text2" alt="Text2.txt" region="text" 3dtext="13,14,15,
16"/>
<img src="image1.gif" alt="cap.gif" region="image"/>
<audio src="audio3.amr" begin="5000ms" end="10000ms"/>
</par>
</body>
```

Step S202, a receiving end receives the information which contains 3D display information, parses the information, finds the content which needs to be displayed in 3D in the information, and plays same to a user in a 3D manner, For example, the content which needs to be displayed in 3D is generated into two views corresponding to the left and right eyes respectively, and these two views are played to the left eye and right eye of the person respectively so as to achieve 3D effects.

Figure 4:
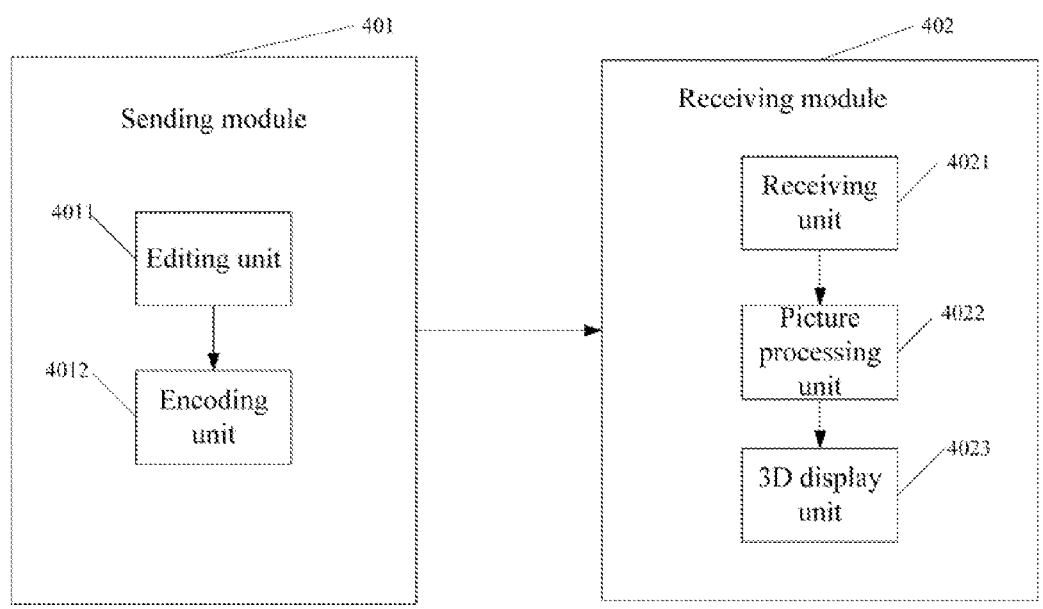
FIG. 4 is a structure diagram of a second embodiment of the disclosure.

As shown in FIG. 4, it is a structure diagram of a second embodiment of the disclosure, and an information transmission system is provided, which comprises a sending module 401 and a receiving module 402, wherein the sending module 401 and the receiving module 402 can be of an integrated structure and can also be receiving separate structures, wherein, the sending module 401 comprises, an editing unit 4011 configured to, when information is edited on the sending end, mark, with a 3D display label, a content required by a user or a content designated by a system;

an encoding unit 4012, configured to encode the information which is edited by the editing unit 4011 and then send the encoded information, wherein in particular, in a short message, the location of the content which needs to be displayed in 3D is marked by adding a TD-UDH cell to the PDU; and in a multimedia message, the content which needs to be displayed in 3D is described in the SMIL of the Content-Type (multimedia message information content) in the signaling.

The receiving module 402 comprises, a receiving unit 4021 configured to receive the information which contains the content with the 3D display label, parse the information to obtain the content which needs to be displayed in 3D in the information and transmit same to an image processing unit 4022;

the image processing unit 4022 configured to pre-process the obtained content which needs to be displayed in 3D, to obtain at least one 3D view and transmit same to a 3D display unit 4023; and the 3D display unit 4023, configured to display the obtained view in 3D. For example, two pictures of the 3D view are played respectively to the left eye and the right eye of the person, and when viewing this information, the user has a protrusive or recessive stereoscopic feeling on the specific content.

The above description illustrates and describes preferred embodiments of the disclosure; however, as described above, it should be understood that the disclosure is not limited to the form disclosed herein, shall not be viewed as an exclusion of other embodiments, but can be used for various other combinations, modifications and environments, and modifications can be made by means of the above teaching or technology or knowledge in the related art within the concept scope of the invention herein. The modifications and variations made by those skilled in the art shall not depart from the spirit and scope of the disclosure and shall fall into the scope of protection of the appended claims of the disclosure.

What is claimed is:

1. An information display method, comprising
when editing information, a sending end marking, with a 3D display label, a content required by a user or a content designated by a system, and sending the encoded label after encoding the label; and
a receiving end receiving the information, performing parsing to obtain the content, which is marked with the 3D display label, in the information, performing pre-processing to obtain a 3D view, and performing 3D display;
wherein the sending end encoding the label is:
when the information is a short message, marking at least one location of the content which needs to be displayed in 3D by adding a User Data Header (TD-UDH) cell to a Protocol Data Unit (PDU); wherein in the PDU, when a user data header identification (TD-UDHI) is 1, it is determined that there is the TP-UDH cell before the short message data; or,
when the information is a multimedia message, describing the content which needs to be displayed in 3D in the Synchronized Multimedia Integration Language (SMIL) of the multimedia message information content (Content-Type) in a signaling.

2. The method according to claim 1, wherein the content with the 3D display label is text information.

3. An information transmission system, wherein the system comprises a sending module and a receiving module, wherein,
the sending module comprises:
an editing unit, which connected with an encoding unit, configured to, when editing information, mark, with a 3D display label, a content required by a user or a content designated by a system; and
the encoding unit, which connected with the editing unit, configured to, after encoding the information which is edited by the editing unit, send the encoded information; and
the receiving module comprises:
a receiving unit, which connected with an image processing unit, configured to, after receiving the information which contains the content with the 3D display label, parse the information to obtain the content which needs to be displayed in 3D in the information, and transmit the content which needs to be displayed in 3D to the image processing unit;
the image processing unit, which connected with the receiving unit and a 3D display unit, configured to pre-process the obtained content which needs to be displayed in 3D to obtain a 3D view, and to transmit the 3D view to the 3D display unit; and
the 3D display unit, which connected with the image processing unit, configured to display the obtained 3D view in 3D;
wherein the encoding unit is particularly configured to, when the information is a short message, mark at least one location of the content which needs to be displayed in 3D by adding a User Data Header (TD-UDH) cell to a Protocol Data Unit (PDU), wherein in the PDU, when a user data header identification (TD-UDHI) is 1, it is determined that there is the TP-UDH cell before the short message data; or,
the encoding unit is particularly configured to, when the information is a multimedia message, describe the content which needs to be displayed in 3D in the Synchronized Multimedia Integration Language (SMIL) of the multimedia information content (Content-Type) in a signaling.

4. A sending module, the sending module comprising:
an editing unit, which connected with an encoding unit, configured to, when editing information, mark, with a 3D display label, a content required by a user or a content designated by a system;
the encoding unit, which connected with the editing unit, configured to, after encoding the information which is edited by the editing unit, send the encoded information;
wherein the encoding unit is particularly configured to, when the information is a short message, mark at least one location of the content which needs to be displayed in 3D by adding a User Data Header (TD-UDH) cell to a Protocol Data Unit (PDU), wherein in the PDU, when a user data header identification (TD-UDHI) is 1, it is determined that there is the TP-UDH cell before the short message data; or,
the encoding unit is particularly configured to, when the information is a multimedia message, describe the content which needs to be displayed in 3D in the Synchronized Multimedia Integration Language (SMIL) of the multimedia information content (Content-Type) in a signaling.

* * * * *